United States Patent [19]

Dietrich

[11] 3,856,491
[45] Dec. 24, 1974

[54] AIR FILTER AND AIR FILTERING SYSTEM

[76] Inventor: Charles Dietrich, 1794 Los Gatos-Almaden Rd., San Jose, Calif. 95124

[22] Filed: June 7, 1973

[21] Appl. No.: 367,795

[52] U.S. Cl.............. 55/478, 55/496, 55/500, 55/509, 55/511
[51] Int. Cl............................................. B01d 46/16
[58] Field of Search............ 55/361, 374, 376, 377, 55/378, 478, 496, 499, 502, 521, 495, 504, 511, 500, 501, 509

[56] References Cited
UNITED STATES PATENTS

| | | | |
|---|---|---|---|
| 931,014 | 8/1909 | McGerry | 55/485 |
| 2,614,883 | 10/1952 | Anderson, Jr. et al. | 55/521 |
| 2,789,661 | 4/1957 | Brace | 55/502 |
| 2,825,941 | 3/1958 | Lux et al. | 52/2 |
| 3,273,943 | 9/1966 | Russell | 55/502 |
| 3,385,039 | 5/1968 | Burke et al. | 55/501 |
| 3,538,686 | 11/1970 | Schwab | 55/378 |

Primary Examiner—Frank W. Lutter
Assistant Examiner—David L. Lacey
Attorney, Agent, or Firm—Hubert E. Dubb, Esq.

[57] ABSTRACT

The invention comprises an improved filter for use in air-conditioning ducts and the like and further comprises an improved air-conditioning duct filtering system. The filter is collapsible so that it may be inserted through a relatively small opening into a relatively small cross-sectional area section of duct-work. Once inside the duct-work, the filter is unfolded into its operational shape. The filter is put into its operational shape by inflating a tube which forms the base of a pyramid of triangular shaped filter elements. The tube, when inflated, presses against the sides of the duct. The apex of the pyramid points in opposition to the direction of the air flow and appropriate stops are provided downstream flow-wise of the base of the filter to prevent the filter from being carried down the air-conditioning duct. The tube which forms the base of the filter is valved so that the air pressure therein can be released and the filter collapsed and folded again within the duct so that it can be removed therefrom via a relatively small opening and replaced with another identical filter.

8 Claims, 4 Drawing Figures

PATENTED DEC 24 1974  3,856,491

AIR FILTER AND AIR FILTERING SYSTEM

BACKGROUND OF THE INVENTION

The invention relates to filtering of air in forced air ducting systems such as air-conditioning systems.

Forced air ducting systems are very commonly used in our society. They are used, for example, in heating and/or air-conditioning of both residences and commercial edifices.

In the case of residences, the filter used is generally a simple flat rectangular pad of spun fibreglass, natural fibres or the like and is normally installed adjacent the air intake to a furnace or air-conditioning unit. Because of the relatively low volume of air pumped through a residence, such filters need generally be changed no more often than once every few months.

In commercial edifices on the other hand, the volume of air pumped is extremely large and hence it is desirable that filters be readily available for changing on a much more regular basis. Generally in the heating and air-conditioning ducting of a commercial edifice, one or more filter boxes are provided, through which boxes the air flowing through the air duct system is guided. The interior of such boxes must be available for changing filters and furthermore, in order to prevent a buildup of back pressure, the boxes have a relatively large cross-sectional area perpendicular to the direction of flow as compared to the cross-sectional area of the ducting.

The use of large filter boxes in conjunction with relatively small ducting, leads to a number of problems. First, there is a problem of leakage at the points where the ducting is expanded to the size of the filter box. Second, there is the very important problem of leakage at the peripheries of the relatively large doors through which filter elements are removed and inserted. Such doors are necessarily large because the filter elements of the prior art are not foldable and must be inserted at their full size. A still further disadvantage of the filter boxes is that they take a good deal of time to construct, thereby significantly increasing the construction cost of the edifice.

An efficient and easily-changeable air filter which can be inserted into an air-conditioning ducting system through a relatively small opening would thus be highly desirable in that it would solve a number of the above-mentioned problems. The present invention provides just such an air filter and further provides, in combination, an air filtering system particularly useful in commercial edifices.

It is, therefore, an object of the present invention to provide an air filter which can be inserted into an air-conditioning ducting filtering unit when in a folded state.

It is a further object of the invention to provide an air filter which is easily changeable.

Still another object of the invention is to provide an air filtering system which does not require the construction of large filter boxes.

These and other objects of the invention, which will become apparent from the following description, are accomplished as set out herein.

BRIEF DESCRIPTION OF THE DRAWING

For a better understanding of the improved foldable air filter and the improved air filtering system of the present invention, reference may be had to the accompanying drawing which is incorporated herein by reference thereto and in which.

SUMMARY OF THE INVENTION

The invention comprises an improved foldable air filter and an improved air filtering system.

The filter comprises an inflatable tube which when inflated defines a polygon having at least four sides, an orifice communicating with the interior of said tube for inflating and deflating it, a plurality of triangular-shaped filter elements in a number equal to the number of sides of said polygon, each triangular-shaped filter element having the base thereof of the same length as a side of said polygon and said base being attached to said side, the adjacent legs of adjacent of said elements being attached to one another and said triangular shaped filter elements being of such a size that the apexes of said triangular elements coincide.

The improved air filtering system of the present invention comprises in combination, the air filter described immediately above and an air filtering duct having attached to the interior surface thereof, a means for stopping said filter from being propelled downstream within said duct through action of the air flowing therein.

DESCRIPTION OF THE PREFERRED EMBODIMENT

Figure 1:
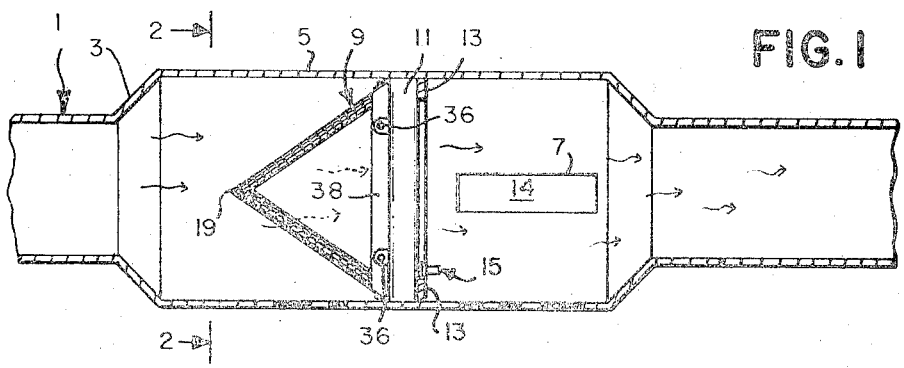
FIG. 1 is a side section view illustrating the improved foldable air filter of the present invention in the improved air-filtering system of the present invention.

Referring first to FIG. 1, a normal air-conditioning duct 1 can be seen. The duct 1 is shown as being expanded via the shoulder 3 to form a larger diameter duct 5. In some embodiments of the invention, it is possible to utilize the filter of the present invention without the need for increasing the diameter of the ducting system. Thus, the illustration of a larger diameter duct 5 is not meant to be limiting on the usability of the air filter of the present invention. The air within the duct 1 and the larger diameter duct 5 flows from left to right as indicated by the arrows.

Figure 4:
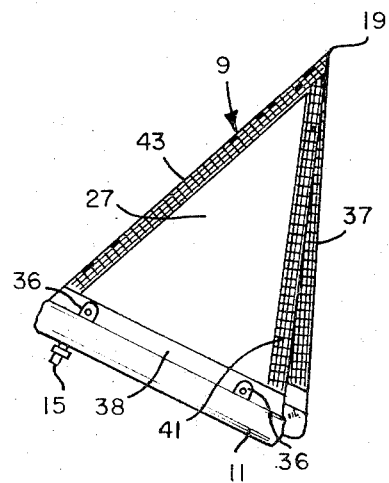
FIG. 4 illustrates the filter of the present invention in folded form, with leg 39 folded inwardly towards leg 43 and with face 27 folded inwardly towards face 21.

Access to the interior of the larger diameter duct 5 is provided via the window 7. The window 7 is made large enough so that the filter 9 can be inserted therethrough when the tube 11 is in a deflated condition and the filter is folded as illustrated in FIG. 4. Stopping means, in this case the ridge 13, is provided so that the filter 9 cannot be forced downstream within the large diameter duct 5 due to the flow of the air therethrough. A tight-fitting cover 14 is provided to fully seal the window 7 when the window 7 is not being used to remove or replace the filter 9.

Attached to and communicating with the tube 11, is a nipple valve 15 which can be similar to automobile tire valves, which gives access to the interior of the tube 11. The tube 11 is inflatable or deflatable through the nipple valve 15. Appropriate length tubing (and valving) may be attached to the nipple valve 15 to facilitate filling of the tube 11 within the large diameter duct 5.

The tube 11 of the filter 9, as stated previously, is on the upstream side of the ridge 13 to prevent the filter 9 from being blown downstream within the large diameter duct 5 through action of the air flow from left to right in FIG. 1.

In order to prevent uneven accumulation of dirt and duct within the filter 9, the apex 19 formed where the apexes of the four triangles 21, 23, 25 and 27 meet, is placed in opposition to the direction of flow. If the filter 9 is placed so that the tube 11 is upstream of the ridge 13, but the apex 19 is downstream of the ridge 13, then uneven collection of dirt may occur and the area of the filter in the vicinity of the apex 19, may become clogged.

Figure 2:
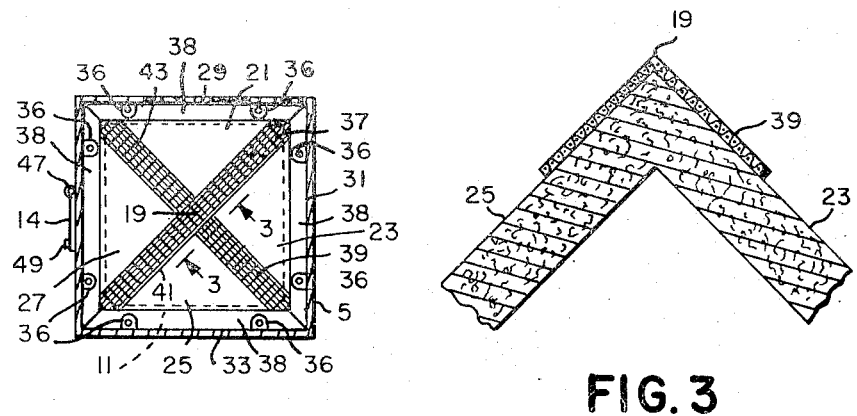
FIG. 2 is a top view illustrating the filter of the present invention.
Figure 3:
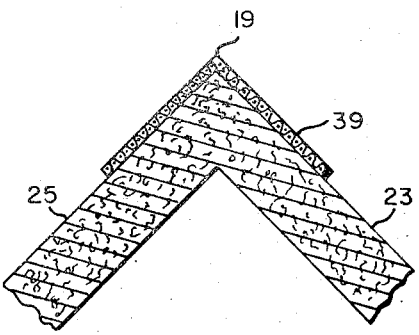
FIG. 3 illustrates section 3—3 of FIG. 2.

The triangles 21, 23, 25 and 27, which are shown best in FIG. 2, are made of any typical filter materials such as spun fibreglass, natural fibres or the like. The triangles 21, 23, 25 and 27 are attached at their bases 29, 31, 33 and 35, respectively, to the tube 11, either permanently or detachably as via the snaps 36 upon the support strips 38 as illustrated in the drawing. If the triangles 21, 23, 25 and 27 are detachably attachable to the tube 11, it is possible to reuse the tube 11 and simply replace the four triangles 21, 23, 25 and 27. The triangles 21, 23, 25 and 27 are further attached at their legs to the next adjacent triangle. Thus, triangle 21 is attached to triangle 23 at leg 37 and to triangle 27 at leg 43. Similarly, triangle 23 which is attached via leg 37 to triangle 21 is also attached via leg 39 to triangle 25.

The attachment of the legs of adjacent triangles to one another is important in that the attachment material should be sufficiently flexible so that the filter of the present invention can be folded into the shape shown in FIG. 4, but at the same time should be sufficiently rigid so that it will provide structural strength when the filter 9 is utilized within an air-conditioning duct such as the large diameter duct 5. Thus, the triangle shaped filter elements 21, 23, 25 and 27 should be bendably attached to one another along the legs of adjacent triangles. An especially useful material in this regard is simple lightweight screening material such as lightweight window screen, preferably made from metal. Alternatively, e.g., metal rods can be attached between and along the legs of adjacent triangles. The tube 11 can be made of any material which can be relatively easily inflated such as rubber or any of a number of plastics.

The tightfitting cover 14 which is used to close the window 7, is shown in FIG. 2. The particular cover illustrated shows a simple hinge 47 and clasp 49 arrangement, although of course any door which will form a good tight seal may be used.

In the preferred embodiment of the invention, as is apparent from examination of the drawing, the polygon-shaped ducting 5 is rectangular in cross-section and more correctly is square in cross-section. The polygon shape of the polygon-shaped tube 11, of course, corresponds to the shape of the cross-section of the ducting 5 perpendicular to the direction of flow therethrough. It is understood that the invention is not meant to be limited to particularly shaped ducting 5 and tubes 11 and that foldable filters can be produced in accordance with the present invention which will have other than four sides formed by the inflatable tubes 11 thereof. For example, use with circular cross-section ducting is contemplated using a filter produced in accordance with the present invention and in this case, it is considered that the number of sides of the polygon formed by the tube 11 is infinite and that the triangles which form the now-cone-shaped filter 9 are infinite in number and fall upon the conical surface of 9. In a square cross-section shaped duct, such as the large duct 5, the triangles 21, 23, 25 and 27 which form the pyramid 29, will generally be isosceles triangles and the filter 9 will assume a completely pyramidal shape.

When said filter elements are referred to herein as triangular-shaped, it is to be understood that this term is used in a broad sense. Thus, triangular-shaped filter elements are included which have been truncated adjacent their apexes as by being cut off and/or folded back downwardly toward said base. Also, and by way of corollary, when it is stated herein that the apexes of said triangular-shaped elements coincide it is to be understood that in the case of truncated triangular-shaped filter elements said apexes would coincide in the absence of truncation.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of appended claims.

That which is claimed is:

1. An improved and foldable air filter, comprising:
   1. an inflatable tube which when inflated defines a polygon having at least four sides;
   2. an orifice communicating with the interior of said tube for inflating and deflating said tube; and
   3. a plurality of triangular shaped filter elements in a number equal to the number of sides of said polygon, each triangular shaped filter element having the base thereof of the same length as a side of said polygon and said base including means for attaching said base to said side, the adjacent legs of adjacent of said triangular shaped filter elements being bendably attached to one another, by attachment material sufficiently flexible so that the filter can be folded said triangular shaped filter elements being of such a size that the apexes of said triangular shaped filter elements coincide.

2. A filter in accordance with claim 1, wherein said triangular shaped filter elements are detachably attached at their bases to the sides of said polygon.

3. In combination, the improved foldable filter of claim 1 within a duct, said duct having an inlet end and an outlet end thereof and being adapted to conduct a flow of air from said inlet thereof to said outlet end thereof said duct having an entry port and a cover therefor and said duct further having a means therein for stopping said inflatable tube when inflated, from being swept along by air flow therein, the improved foldable filter being within said duct and having its apex opposed to the direction of air flow therein and further having said inflatable tube between said inlet end of said duct and said stopping means.

4. A combination as in claim 3, wherein said polygon is a rectangle and said stopping means comprises a ridge within and attached to said duct.

5. A filter in accordance with claim 1, wherein said polygon comprises a rectangle.

6. A filter in accordance with claim 5 wherein said rectangle comprises a square.

7. A filter in accordance with claim 5 wherein said triangular shaped filter elements are in the shape of isosceles triangles.

8. A filter in accordance with claim 7 wherein said triangular shaped filter elements are in the form of isosceles triangles and said filter is in the shape of a pyramid.

* * * * *